United States Patent
Takasu et al.

(10) Patent No.: US 9,697,509 B2
(45) Date of Patent: Jul. 4, 2017

(54) CONTROL SYSTEM, CONTROL METHOD THEREOF, AND CONTROLLER THEREOF

(71) Applicant: SEIKO EPSON CORPORATION, Tokyo (JP)

(72) Inventors: Kazuhiro Takasu, Shiojiri (JP); Koichiro Tsutsumi, Matsumoto (JP); Shigeo Ikeda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 41 days.

(21) Appl. No.: 14/167,571

(22) Filed: Jan. 29, 2014

(65) Prior Publication Data

US 2014/0214565 A1 Jul. 31, 2014

(30) Foreign Application Priority Data

Jan. 30, 2013 (JP) ................................ 2013-016056

(51) Int. Cl.
*G06Q 20/20* (2012.01)
*G07G 1/00* (2006.01)
*G07G 1/14* (2006.01)

(52) U.S. Cl.
CPC ........... *G06Q 20/20* (2013.01); *G06Q 20/201* (2013.01); *G06Q 20/202* (2013.01); *G06Q 20/204* (2013.01); *G06Q 20/208* (2013.01); *G06Q 20/209* (2013.01); *G07G 1/0009* (2013.01); *G07G 1/14* (2013.01)

(58) Field of Classification Search
CPC ....... G06Q 20/20; G06Q 20/202; G06Q 20/10
USPC ....... 705/16, 17, 21, 304, 64, 347; 340/5.81; 345/173; 235/380, 383, 385
See application file for complete search history.

(56) References Cited

U.S. PATENT DOCUMENTS

| | | | | |
|---|---|---|---|---|
| 8,239,271 B2* | 8/2012 | Duvall | ...................... | G06F 8/20 235/375 |
| 2003/0005041 A1* | 1/2003 | Ullmann | ........... | G06F 17/30884 709/203 |
| 2003/0167207 A1* | 9/2003 | Berardi | ................ | G06Q 10/025 705/16 |
| 2004/0222302 A1* | 11/2004 | Matsumori | ........ | G06K 7/10851 235/472.01 |

(Continued)

FOREIGN PATENT DOCUMENTS

| JP | 573769 A | 3/1993 |
|---|---|---|
| JP | 2005227144 A | 8/2005 |

(Continued)

OTHER PUBLICATIONS

Extended European Search Report issued Apr. 25, 2014, corresponds to European patent application No. 14151701.1.

(Continued)

*Primary Examiner* — Vanel Frenel
(74) *Attorney, Agent, or Firm* — Hauptman Ham, LLP

(57) ABSTRACT

In a control method of a control system including a terminal configured to execute an application, a device configured to send or receive data, and a controller connected to the device, a request for a device control is transmitted from the application to the controller. At the controller, the device control by the controller is established after the controller receives the request. At the terminal, the device control by the application through the controller is established after establishing the device control by the controller.

11 Claims, 10 Drawing Sheets

(56) References Cited

U.S. PATENT DOCUMENTS

| | | |
|---|---|---|
| 2005/0193262 A1 | 9/2005 | Osaka et al. |
| 2005/0200490 A1* | 9/2005 | Teller .................... 340/618 |
| 2006/0144946 A1* | 7/2006 | Kuriyama ............ G06K 7/1095 235/462.1 |
| 2007/0005685 A1 | 1/2007 | Chau et al. |
| 2007/0276763 A1* | 11/2007 | Kleinman et al. ............ 705/64 |
| 2008/0208696 A1 | 8/2008 | Olson |
| 2009/0037940 A1 | 2/2009 | Ng et al. |
| 2009/0228336 A1* | 9/2009 | Giordano et al. ............ 705/10 |
| 2009/0259516 A1* | 10/2009 | Zeevi .................... G06Q 30/02 705/14.65 |
| 2011/0106976 A1 | 5/2011 | Chen |
| 2011/0231272 A1* | 9/2011 | Englund ............... G06Q 20/20 705/21 |
| 2012/0066079 A1* | 3/2012 | Falzone ............... G06Q 20/20 705/16 |
| 2013/0066733 A1* | 3/2013 | Levy .................... G06Q 30/06 705/16 |
| 2013/0085899 A1* | 4/2013 | Tyra et al. .................. 705/27.2 |
| 2013/0166408 A1* | 6/2013 | Edwards .................... 705/26.7 |
| 2014/0095382 A1* | 4/2014 | Desai et al. .................... 705/41 |
| 2014/0258051 A1* | 9/2014 | Bostwick ............ G06Q 20/203 705/28 |

FOREIGN PATENT DOCUMENTS

| | | |
|---|---|---|
| JP | 2012-14343 A | 1/2012 |
| TW | 201117585 A1 | 5/2011 |

OTHER PUBLICATIONS

Naoya Takaku, "Automatic Recognition in Mobile Environment and Cloud Environment", Apr. 10, 2012, Monthly Magazine of Automatic Recognition vol. 25(4), p. 23-25, Japan Industrial Publishing Co., LTD., Japan.

* cited by examiner

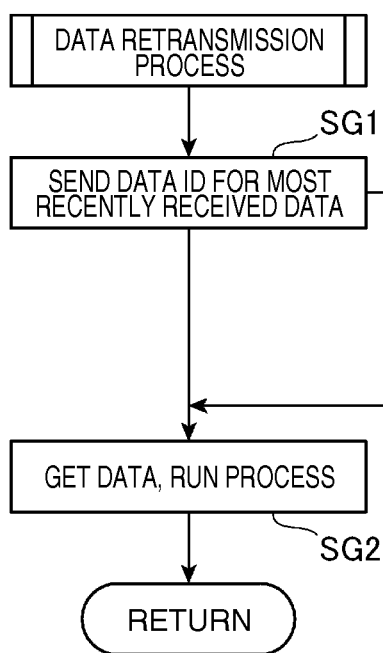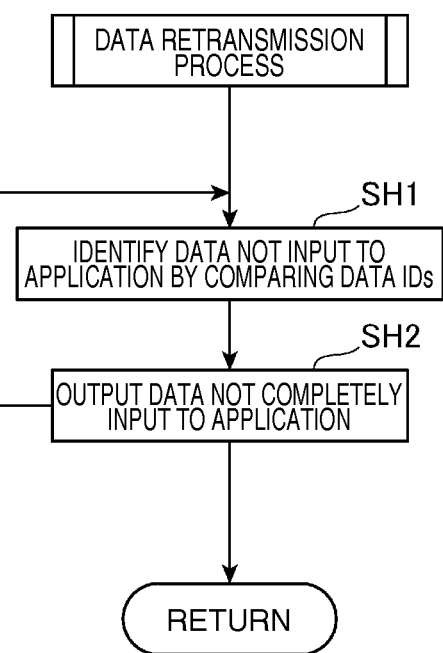
FIG. 10A
FIG. 10B

US 9,697,509 B2

CONTROL SYSTEM, CONTROL METHOD THEREOF, AND CONTROLLER THEREOF

RELATED APPLICATION(S)

The instant application claims the benefit of Japanese patent application No. 2013-016056 filed Jan. 30, 2013, the entire disclosure of which is incorporated by reference herein.

BACKGROUND

1. Technical Field

The present disclosure relates to a control method of a control system including a control device to which a device is connected, and a terminal that communicates with the control device.

2. Related Art

JP-A-H05-73769 discloses a point-of-sale (POS) system that has a POS terminal and a POS controller connected to the POS terminal, and executes processes including recording images by the cooperation of the POS terminal and POS controller. Devices such as a barcode scanner and card reader are normally connected to the POS terminal in this type of POS system.

SUMMARY

According to some embodiments, in a control method of a control system including a terminal configured to execute an application, a device configured to send or receive data, and a controller connected to the device, a request for a device control is transmitted from the application to the controller. At the controller, the device control by the controller is established after the controller receives the request. At the terminal, the device control by the application through the controller is established after establishing the device control by the controller.

In some embodiments, a control system comprises a device configured to send or receive data, a terminal and a controller. The terminal includes a terminal control unit configured to execute an application configured to output a request for control of the device by the application, and a first communication module configured to transmit the request of the application. The controller includes a second communication module configured to connect with the first communication module to receive the request from the application, an interface configured to connect to the device, and a controller control unit. The controller control unit is configured to, in response to the request received from the application via the first and second communication modules, instantiate a control object configured to communicate with the device via the interface. The terminal control unit is configured to, in response to instantiation of the control object, instantiate an interface object configured to communicate between the control object and the application. The control object and the interface object are configured to enable the control of the device by the application via the interface, the control object, the first and second communication modules, and the interface object.

In some embodiments, a controller of a control system, the control system further including a terminal configured to execute an application and a device configured to send or receive data, comprises a communication module, an interface and a controller control unit. The communication module is configured to connect with the terminal to receive a request for control of the device from the application. The interface is configured to connect to the device. The controller control unit is configured to, in response to the request received from the application, instantiate a control object. The control object is configured to communicate with the device via the interface and communicate with an interface object instantiated at the terminal, to enable the control of the device by the application via the interface, the control object, and the interface object.

BRIEF DESCRIPTION OF THE DRAWINGS

FIGS. 10A and 10B are flowcharts showing the operation of a tablet and a control device according to at least one embodiment.

DESCRIPTION OF EMBODIMENTS

Exemplary embodiments of the present disclosure are described below with reference to the accompanying drawings.

Figure 1:
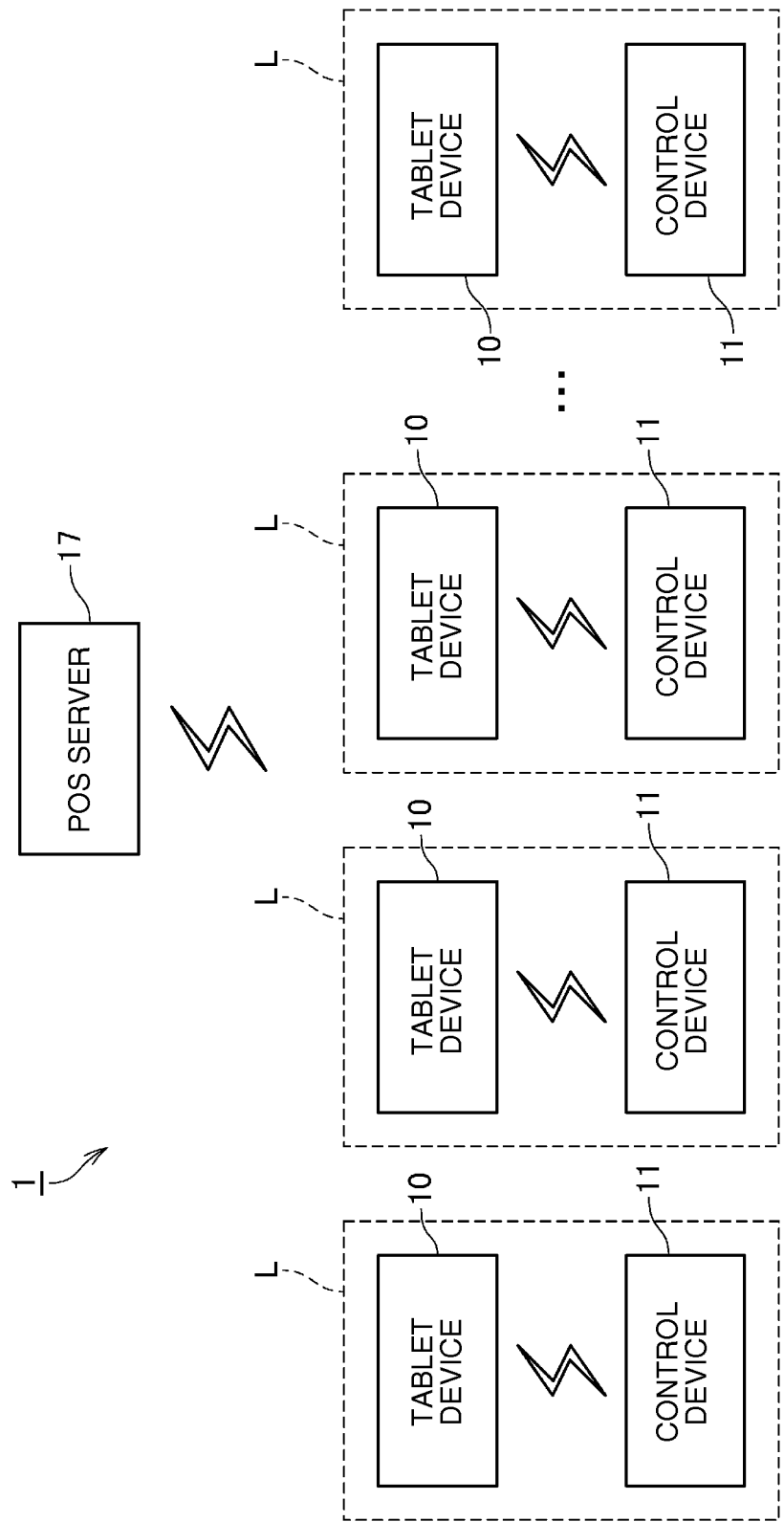
FIG. 1 is a block diagram showing the configuration of a control system according to at least one embodiment of the disclosure.
Figure 2:
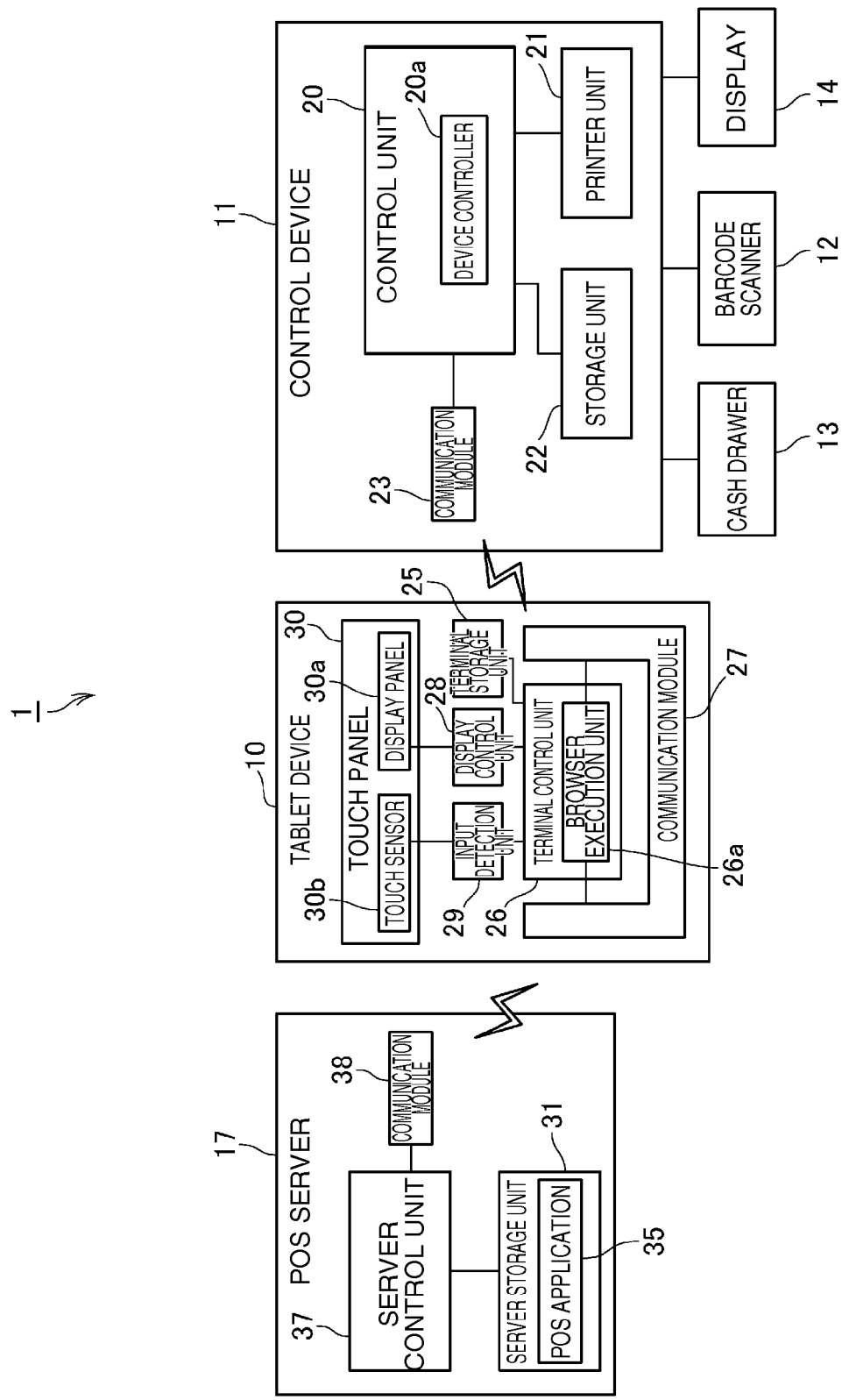
FIG. 2 is a block diagram showing the configuration of devices in the control system according to at least one embodiment.

FIG. 1 is a block diagram schematically showing the configuration of a control system, and FIG. 2 is a block diagram showing the configuration of devices in the control system, according to some embodiments. The control system includes a terminal, a controller and a server. In the description of at least one embodiment below, the control system includes a POS (point-of-sale) system 1, the terminal includes a tablet device 10, the controller includes a control device 11, and the server includes a POS server 17.

The POS system 1 is a system used, for example, in a retail store in a shopping center, a department store, or convenience store, in the food service industry such as a restaurant, coffee shop, or bar, and in other types of businesses and facilities. The functions of the POS system 1 include, for example, managing product sales, product inventory, and sales trends in a store, processing sale transactions at checkout counters L in a store according to the products purchased by a customer, producing receipts based on the payment received from the customer, and providing transaction-related information to the customer.

Checkout counters L where sale transactions are processed are located in a store where the POS system 1 is used. One control device 11 and a tablet device 10 that communicates wirelessly with the control device 11 are installed at each checkout counter L.

The tablet device 10 is a tablet computer, and in at least one embodiment as shown in FIG. 6 and described below, the tablet device 10 is a computer that has a touch panel 30 covering substantially the entire front surface and enables input by touch.

The tablet device 10 is a terminal used by the checkout clerk responsible for transactions at the checkout counter L, and as described below provides a user interface to the checkout clerk when processing a transaction at the checkout counter L.

The control device 11 is a device that functions as a controller. As shown in FIG. 2, connected to the control device 11 are one or more devices such as a barcode scanner 12 for reading barcodes on products or product packaging, a cash drawer 13 for holding cash, checks, or other payment instruments, and a display 14 for displaying transaction data for the customer.

As shown in FIG. 2, the control device 11 includes a control unit (controller control unit) 20, a printer unit 21 (printer), a storage unit 22, and a communication module 23.

The control unit 20 controls other parts of the control device 11, and includes CPU, ROM, RAM, and other peripheral circuits. The control unit 20 also has a device controller 20a described further below.

The printer unit 21 includes a conveyance mechanism for conveying roll paper, a print mechanism that prints text and images on the roll paper using a thermal head, and a cutting mechanism for cutting the roll paper, and can produce a receipt by cutting the roll paper at a specific position after printing a receipt-related image on the roll paper.

The storage unit 22 includes EEPROM or other nonvolatile memory, and stores data nonvolatilely so that the data can be overwritten.

The communication module 23 includes a module and circuits, such as a network card conforming to a particular communication standard, for communicating wirelessly with the tablet device 10, and communicates wirelessly according to the specific communication standard with the tablet device 10 as controlled by the control unit 20.

The tablet device 10 includes a terminal storage unit 25, a terminal control unit 26, a communication module 27, an input detection unit 29, and a touch panel 30. The terminal control unit 26 includes a display control unit 28.

The terminal storage unit 25 is EEPROM or other nonvolatile memory, and nonvolatilely stores data rewritably.

The touch panel 30 includes a display panel 30a disposed on the front of the tablet device 10, and an integrally formed touch sensor 30b disposed over the display panel 30a. The display panel 30a is a display such as an LCD panel, OLED panel, or e-paper display, and is driven by the display control unit 28. The touch sensor 30b is an electrostatic or pressure sensitive sensor that is overlaid on the display panel 30a, detects touches by the user's fingers or a pen-like stylus, and outputs a signal indicating the position where the touch was detected to the input detection unit 29. This touch panel 30 is a display unit that displays a browser.

The display control unit 28 displays a screen containing text or images on the display panel 30a by driving the display panel 30a based on display data input from a browser execution unit 26a described below.

The input detection unit 29 detects touch operations on the touch panel 30 based on the signals output by the touch sensor 30b. When a touch operation is detected, the input detection unit 29 generates coordinate data containing coordinates correlating the position that was touched to a display position on the display panel 30a, and outputs the coordinate data to the terminal control unit 26.

The communication module 27 includes a module and circuits, such as a network card conforming to a specific communication protocol, for communicating wirelessly with the control device 11 and POS server 17, and communicates wirelessly based on the specific protocol with the control device 11 and POS server 17 as controlled by the terminal control unit 26.

The terminal control unit 26 controls other parts of the tablet device 10, and includes CPU, ROM, RAM, and other peripheral circuits. The terminal control unit 26 also includes a browser execution unit 26a that renders the function of a browser by running a browser program.

The browser execution unit 26a downloads a web page (such as an HTML file) written in a scripting language or markup language such as HTML from the POS server 17 using a function of the web browser. The downloaded web page data is stored, for example, in RAM not shown. The browser execution unit 26a reads the data of the downloaded web page, generates display data for displaying the web page, and outputs to the display control unit 28. Based on the input display data, the display control unit 28 displays the image of a web page related to the display data on the display panel 30a.

When the input detection unit 29 detects a touch operation on the touch sensor 30b, the browser execution unit 26a determines the input content based on the coordinate data input from the input detection unit 29 according to the touch operation, and the display data output to the display control unit 28. Based on the identified input content, the browser execution unit 26a executes the appropriate process using a script function, for example, as needed.

The POS server 17 includes a server storage unit 31 that stores a database of product-related information, a sales management database, and an inventory management database, and manages the POS system 1 using these databases.

The POS server 17 includes a server control unit 37, server storage unit 31, and communication module 38.

The server control unit 37 controls other parts of the POS server 17, and includes CPU, ROM, RAM, and other peripheral circuits. The server storage unit 31 includes a hard disk drive, EEPROM, or other nonvolatile memory, for example, and nonvolatilely stores data rewritably.

The communication module 38 includes a module and circuits, such as a network card conforming to a particular communication standard, for communicating wirelessly with the tablet device 10, and communicates wirelessly according to the specific communication protocol with the tablet device 10 as controlled by the server control unit 37.

A POS application 35 is installed on the POS server 17.

The browser execution unit 26a of the tablet device 10 executes various processes using a function of the POS application 35 on the POS server 17.

For example, the browser execution unit 26a appropriately asserts a request for an operation to the POS server 17, causes the POS server 17 to execute the requested process using a function of the POS application 35, gets the result of the process, and performs an appropriate process. More specifically, for example, the browser execution unit 26a outputs the result of reading by the barcode scanner 12 to the POS server 17, searches for the product using a function of the POS application 35, gets the result of the search, and then controls the control device 11 to display the product information on the display 14. The browser execution unit 26a also requests calculating the total amount of the transaction, calculates the total using a function of the POS application 35, and after receiving the result of the calculation, controls the control device 11 to produce a receipt on which information including the total is printed.

Note that an "application that runs on a browser" is the POS application 35 or another application installed by the browser execution unit 26a on another device that can communicate, and conceptually includes applications with functions that can be used by the browser execution unit 26a. An application in this example could be an application that is executed by and runs on the other device that can communicate with the browser execution unit 26a, or an application that is downloaded from another device and is executed by and runs on the tablet device 10. The "application that runs on a browser" also includes scripts embedded in a web page (HTML file) that is read by the browser execution unit 26a, as well as programs and other software with functions that can be used by the browser execution unit 26a.

Figure 3:
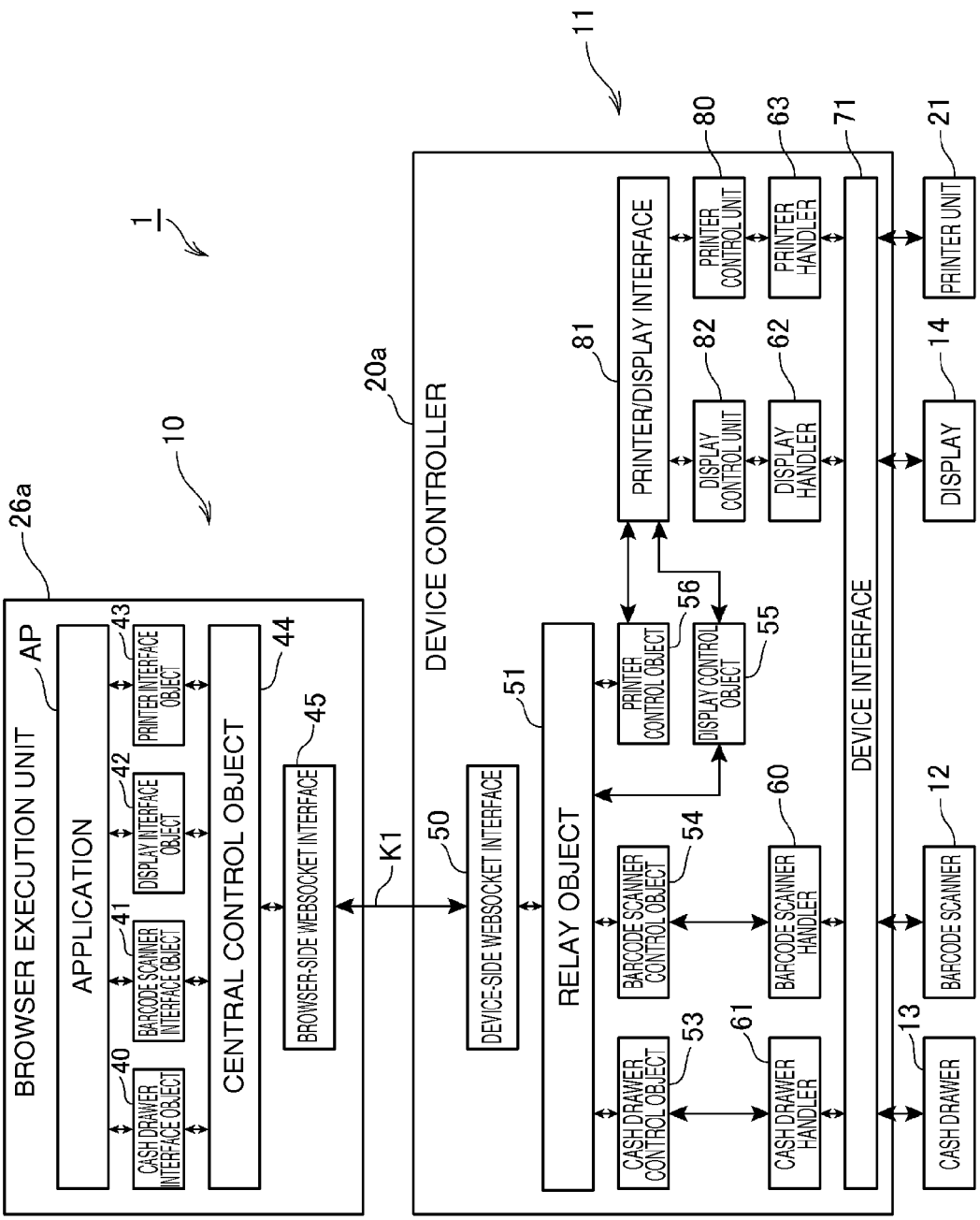
FIG. 3 is a block diagram of a browser execution unit and a device controller according to at least one embodiment.

FIG. 3 is a function block diagram of the browser execution unit 26a of the tablet device 10, and the device controller 20a of the control device 11.

Note that for convenience of description, blocks schematically representing programs, software objects, and functions rendered by programs executed on hardware platform, and blocks representing actual physical devices, are shown on the same level in FIG. 3.

Note also that in at least one embodiment an "object" is an instance in object-oriented programming, and more specifically means a software object defined by data and/or a set of instructions and/or codes. However, an "object" as used herein is not limited to an instance in object-oriented programming, and may be any software object that can render some function.

As shown in FIG. 3, application AP is run by the browser execution unit 26a of the tablet device 10. As described above, application AP conceptually includes an application that, like the POS application 35, can run on another device or can be downloaded from another device to be executed by and run on the tablet device 10, a script embedded in an HTML file that is read by the browser execution unit 26a, as well as a program or software with functions that can be used by the browser execution unit 26a.

At least one of a cash drawer interface object 40 (interface object), a barcode scanner interface object 41 (interface object), a display interface object 42 (interface object), and a printer interface object 43 (interface object), a central control object 44, and a browser-side WebSocket interface 45 can operate on the browser execution unit 26a. At least one of a device-side WebSocket interface 50, a relay object 51, a cash drawer control object 53 (control object), a barcode scanner control object 54 (control object), a display control object 55 (control object), and a printer control object 56 (control object) can operate on the device controller 20a.

Figure 4:
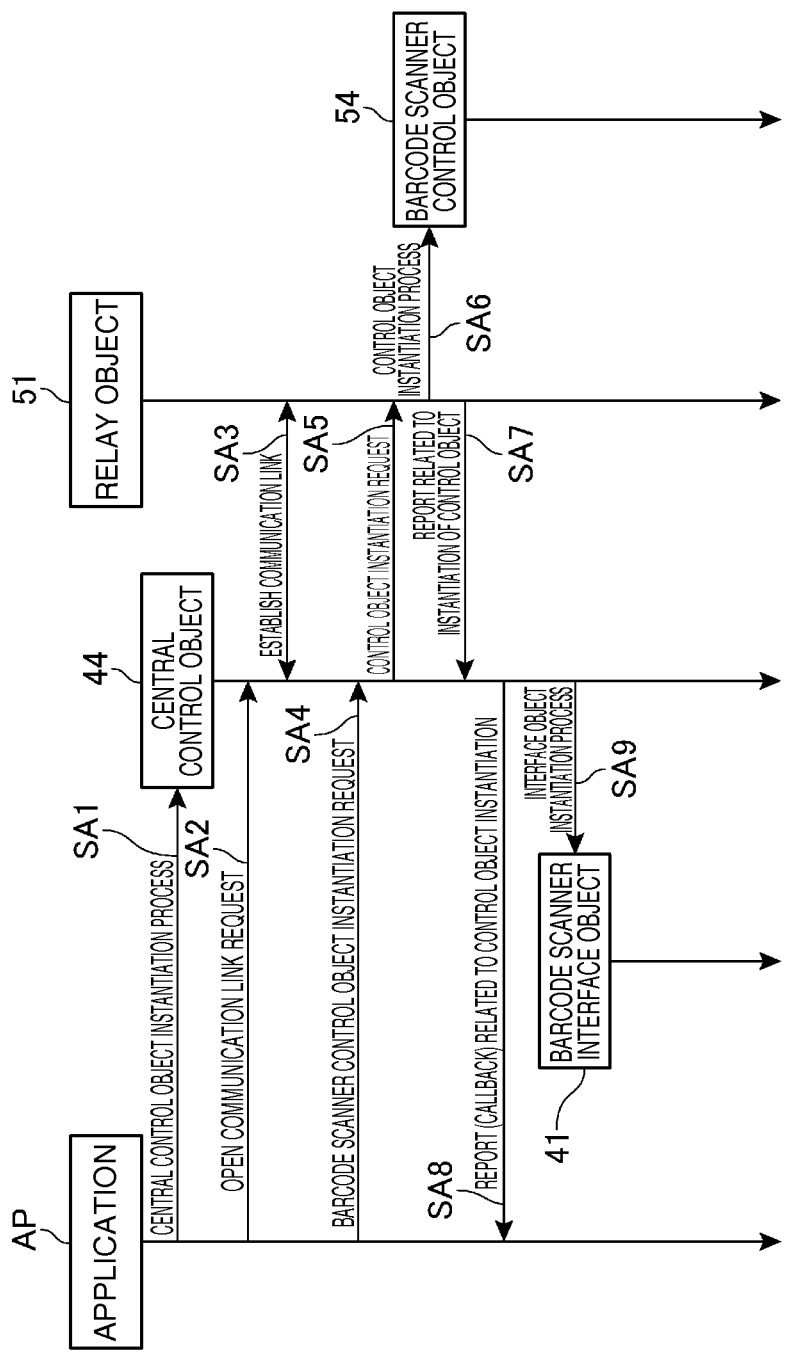
FIG. 4 is a flowchart of a process for instantiating control and interface objects according to at least one embodiment.

Referring first to FIG. 4, the process for generating and the functions of these objects and software interfaces are described first below with reference to the flowchart in FIG. 4.

FIG. 4 is a flowchart of the process whereby objects are created by the browser execution unit 26a and device controller 20a. More particularly, the flowchart in FIG. 4 describes a process whereby objects are created by, as examples, instantiating a barcode scanner interface object 41 as an example of an interface object, and a barcode scanner control object 54 as example of a control object.

Note that in the description below, the operations, actions and/or functionality of the application AP and/or an object are executed by the corresponding CPU (e.g., terminal control unit 26, and/or control unit 20).

The application AP first executes the central control object instantiation process (step SA1). The central control object instantiation process is a process that creates the central control object 44. The central control object 44, as described in detail below, is an object containing instructions and/or codes related to controlling the POS system 1, including instructions and/or codes related to establishing a communication path and the cutting process, and instructions and/or codes related to instantiating and deleting control objects and interface objects.

The central control object instantiation process in step SA1 is executed by, for example, the manufacturer of the control device 11 supplying a dedicated API (application programming interface), and the application AP using a function of the API.

When a central control object 44 is instantiated by the process of step SA1, the application AP asserts a communication request, such as an open communication link request, to establish a communication connection in step SA2. The open communication link request is a request to establish a logical WebSocket communication link K1 (a communication connection conforming to a communication protocol for two-way communication) between the tablet device 10 and control device 11, and causes the devices to establish a link enabling sending and receiving data based on the WebSocket standard. The open communication link request is asserted by the application AP executing a specific set of instructions and/or codes embedded in the central control object 44.

In response to the open communication link request in step SA2, the central control object 44 and relay object 51 together open a connection based on the WebSocket standard and establish a communication link K1 between the browser-side WebSocket interface 45 and device-side WebSocket interface 50 (step SA3).

Note that the browser-side WebSocket interface 45 and device-side WebSocket interface 50 are both function blocks related to a software interface for sending and receiving data using the WebSocket standard. The relay object 51 is an object that is run by the device controller 20a, and includes a set of instructions and/or codes related to the process establishing a communication link K1, and instructions and/or codes related to other processes described below.

The browser-side WebSocket interface 45 and central control object 44 function as a reception unit that receives data to which identification information output from the control device 11 has been added. The device-side WebSocket interface 50 and relay object 51 function as a second communication unit for communicating with a terminal on which the browser runs, a second communication unit that receives communication requests and device control requests from a terminal, or a second communication unit that is connected to and receives requests from a terminal on which the browser runs.

When a communication link K1 is established, a communication link ID (identification information), which is information identifying the communication link K1, is added to the communication link K1 by a function of the central control object 44 or the relay object 51. The assigned communication link ID is stored in the tablet device 10 in a specific storage area of the terminal storage unit 25 in a form enabling referencing by the application AP, and is stored in the control device 11 in a specific storage area of the storage unit 22 in a form enabling referencing by the relay object 51.

By establishing a communication link K1, the tablet device 10 (terminal) and the control device 11 can communicate with each other.

Subsequently, the application AP asserts a device control request, such as a barcode scanner control object instantiation request (step SA4). A barcode scanner control object instantiation request is a process requesting the device controller 20a to instantiate a barcode scanner control object 54. Note that because instantiating a control object establishes a state enabling controlling the corresponding device (establishes control of a device) as further described below, the process of step SA4 is a process of an application (or terminal) requesting control of a device.

Device identification information (a "device ID" below) is assigned to each device connected to the control device 11 according to the type of device. In the following example, "scanner" is assigned as the device ID to the barcode scanner 12.

To instantiate a barcode scanner control object 54, the application AP specifies the device ID of the barcode scanner 12 to be controlled. As will be understood below, the relay object 51 instantiates an appropriate control object corresponding to the device to be controlled using the specified device ID as a key.

Control objects are further described below.

A control object is an object containing instructions and/or codes related to controlling a device, and controls the particular device using a function of a corresponding handler. For example, the cash drawer control object 53 contains a set of instructions and/or codes for executing a process related to controlling the cash drawer 13, and the cash drawer control object 53 controls the cash drawer 13 using a function of a cash drawer handler 61.

A handler is a function or subroutine that executes a process related to the corresponding device as requested. For example, when a barcode is read by the barcode scanner 12, a barcode scanner handler 60 gets the input result of reading the barcode, executes an interrupt process, and passes the read result (such as a numeric string) to the barcode scanner control object 54. The other handlers (cash drawer handler 61, display handler 62, and printer handler 63) function similarly.

The device interface 71 and the handlers function as a first communication unit that communicates with a device.

As described above, control of a device by the control device 11 is established by instantiating a control object.

In response to the barcode scanner control object instantiation request from the application AP, the central control object 44 sends a barcode scanner control object instantiation request to the relay object 51 through the communication link K1 (step SA5).

In response to this request, the relay object 51 instantiates a control object (barcode scanner control object 54 in this example) corresponding to the specified device ID (the device ID "scanner" for the barcode scanner 12 in this example) using a "new" statement, for example (step SA6). In other words, the device controller 20a instantiates the control object, and the instantiated control object runs on the device controller 20a.

In step SA6, the relay object 51 manages the instantiated barcode scanner control object 54 using the communication link ID assigned in step SA3. This also applies to the instantiation of other control objects. Because the control object is linked to a particular communication link ID by the relay object 51, the relay object 51 can know which application AP manages each control object.

An example in which two tablets, a first tablet and a second tablet, are connected to a single control device 11 will be now described. In this example, each tablet establishes a separate (first or second) WebSocket communication link with the control device 11, and a separate (first or second) communication link ID is assigned to each communication link. The first tablet then instantiates a barcode scanner control object 54 in order for a first application AP running on the first tablet to take control of the barcode scanner 12. In this example, the relay object 51 links and manages the barcode scanner control object 54 using the first communication link ID of the first communication link to the first tablet.

The second tablet then instantiates a cash drawer control object 53 in order for a second application AP running on the second tablet to take control of the cash drawer 13. In this example, the relay object 51 links and manages the cash drawer control object 53 using the second communication link ID of the second communication link to the second tablet.

As a result, the relay object 51 outputs data output by the barcode scanner control object 54 based on the result of reading by the barcode scanner 12 to the first tablet through the first communication link with the corresponding first communication link ID. Likewise, when the second application AP running on the second tablet controls the cash drawer 13, and there is data communication through the second communication link to the second tablet, the communicated data is output appropriately to the cash drawer control object 53 corresponding to the second communication link ID of the second communication link.

As a result of the relay object 51 thus managing control objects using the associated communication link ID, control objects will not communicate through the wrong communication link even when a plurality of tablets are connected and a plurality of corresponding communication links are thus established.

When instantiation of the barcode scanner control object 54 is completed, the relay object 51 reports through the communication link K1 to the central control object 44 that instantiation of the object was completed (step SA7), and the central control object 44 passes the report to the application AP (step SA8).

Note that when the barcode scanner control object instantiation process executes in step SA4, a callback that receives the result of the process related to instantiating the control object is declared, and successful instantiation of the barcode scanner control object 54 is reported to the application AP by executing the callback function.

The central control object 44 then instantiates a barcode scanner interface object 41 corresponding to the barcode scanner control object 54 that was instantiated (step SA9).

Interface objects are described below.

An interface object functions as an interface causing the application AP to use the instructions and/or codes embedded in the control object related to the corresponding device when the application AP is used to control the device. More specifically, if when controlling a specific device the application AP outputs information to the interface object corresponding to the specific device, the interface object communicates with the control object corresponding to the specific device, executes a set of instructions and/or codes embedded in the control object, and can control the specific device.

By instantiating this interface object, the application AP can control the device using instructions and/or codes of the control object through the interface object. More specifically, establishing control of a device by the application AP through the control device 11 is accomplished by instantiating an interface object in conjunction with instantiating a control object.

Instantiation of the barcode scanner control object 54 and barcode scanner interface object 41 is thus completed as described above. Control objects and interface objects for other devices are instantiated by similar steps.

As described above, at least one embodiment of the disclosure instantiates a corresponding interface object when instantiation of a control object in the control device 11 is completed. Thus, a control object and interface object pair is always instantiated for any single device, and a state enabling device control by the application AP is established for each device.

An interface object and control object pair is also instantiated for each device connected to the control device 11 in at least one embodiment. As a result, by using functions of the interface object corresponding to a specific device when controlling the specific device, the application AP can reliably control the specific device and can exchange data with the specific device.

Development (programming) of the application AP is also simplified because a program associated with an interface related to controlling a device needs only to consider the relationship to the interface object of each device. For example, in at least one embodiment, routines of the application AP related to controlling the cash drawer 13 only need to consider input and output of information (data) with the cash drawer interface object 40, and development is simplified.

Figure 5:
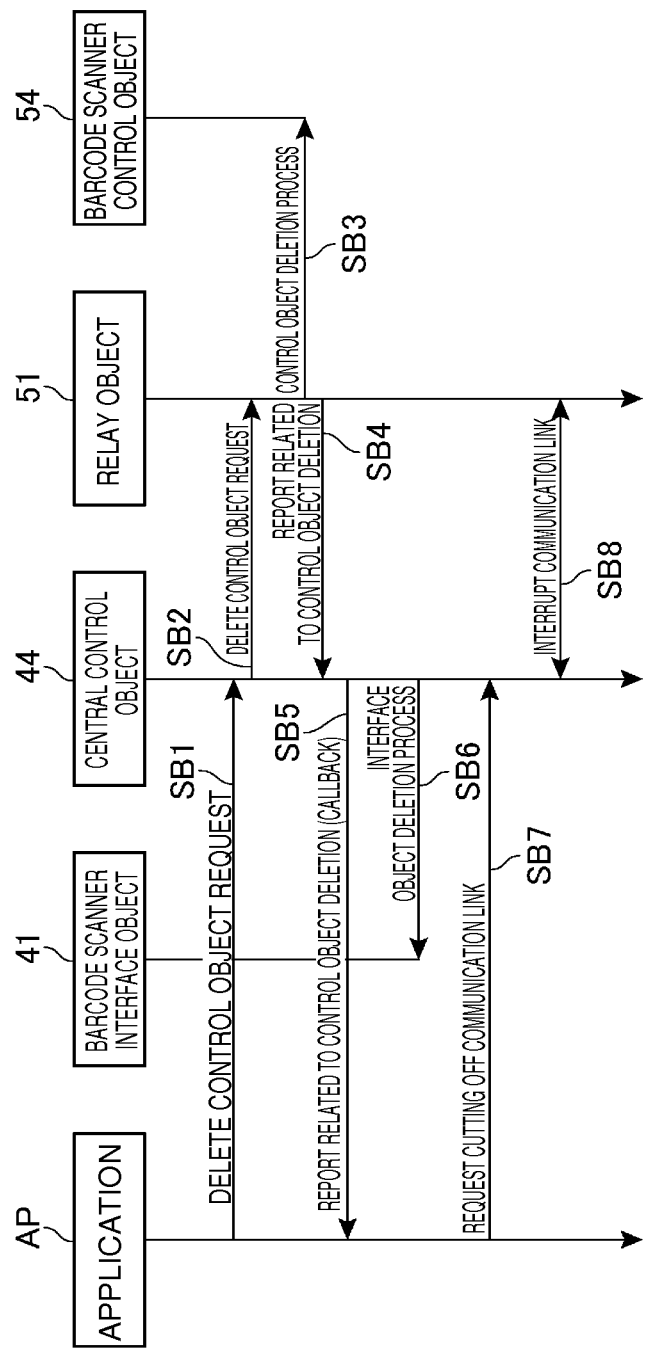
FIG. 5 is a flowchart of a process for deleting control and interface objects according to at least one embodiment.

A process for deleting an instantiated control object and interface object, and closing the established communication link, is described below with reference to FIG. 5. The example in the flowchart in FIG. 5 describes a process for deleting a control object and interface object for the barcode scanner 12.

The application AP first asserts a delete request (device control delete request) for the barcode scanner control object 54 (step SB1). The application AP also specifies the device ID of the barcode scanner 12. The control object delete request is executed by the application AP executing a set of instructions and/or codes embedded in the central control object 44.

In response to the barcode scanner control object 54 delete request from the application AP, the central control object 44 sends a barcode scanner control object 54 delete request to the relay object 51 through the communication link K1 (step SB2).

In response to the delete request, the relay object 51 deletes the control object (the barcode scanner control object 54 in this example) corresponding to the specified device ID (the device ID "scanner" of the barcode scanner 12 in this example) using a delete operator, for example (step SB3). By deleting the control object, control of the barcode scanner 12 by the control device 11 is cancelled.

A specific control object can thus be deleted in at least one embodiment by the application AP asserting a delete control object request. By deleting the control object for a specific device, control of the specific device by an application AP running on one tablet is cancelled, thereby enabling an application AP operating on a different tablet to take control of the specific device. As a result, when a specific device is no longer used, the application AP can release that device by deleting the control object for the specific device, and unnecessary occupation of a device can be prevented.

When deleting the barcode scanner control object 54 is completed, the relay object 51 reports to the central control object 44 through the communication link K1 that deleting the object was completed (step SB4), and the central control object 44 then passes that report to the application AP (step SB5).

Note that a callback that receives the result of the process related to deleting the control object is declared in step SB1, and successful deletion of the barcode scanner control object 54 is reported to the application AP by executing the callback function.

The central control object 44 then deletes the barcode scanner interface object 41 corresponding to the barcode scanner control object 54 that was deleted (step SB6).

Subsequently, the application AP requests cutting the communication link K1 to the control device 11 (cancel communication request) (step SB7). This request is executed by the application AP executing a dedicated set of instructions and/or codes of the central control object 44.

In response to the request asserted in step SB7, the central control object 44 and relay object 51 cut the communication link K1 established between the browser-side WebSocket interface 45 and device-side WebSocket interface 50 according to the WebSocket standard (step SB8).

An instantiated control object and interface object can thus be deleted and an established communication link cancelled as described above.

An instantiated control object can thus be deleted at the desired time by a request from the application AP. More specifically, when maintaining control of a specific device is no longer necessary, the application AP can quickly delete the control object instantiated for that specific device and release control of that specific device.

A specific example of operation in a transaction process is described below.

Before the transaction process executes, the tablet device 10 first executes the following processes.

More specifically, the checkout clerk or the person responsible for another task starts the browser of the tablet device 10, and displays a user interface UI (FIG. 6A) on the touch panel 30. The browser execution unit 26a of the terminal control unit 26 then accesses a specific address on the POS server 17 as instructed, acquires web page data such as an HTML file, and displays the user interface UI on the touch panel 30 based on the acquired data.

Figure 6B:
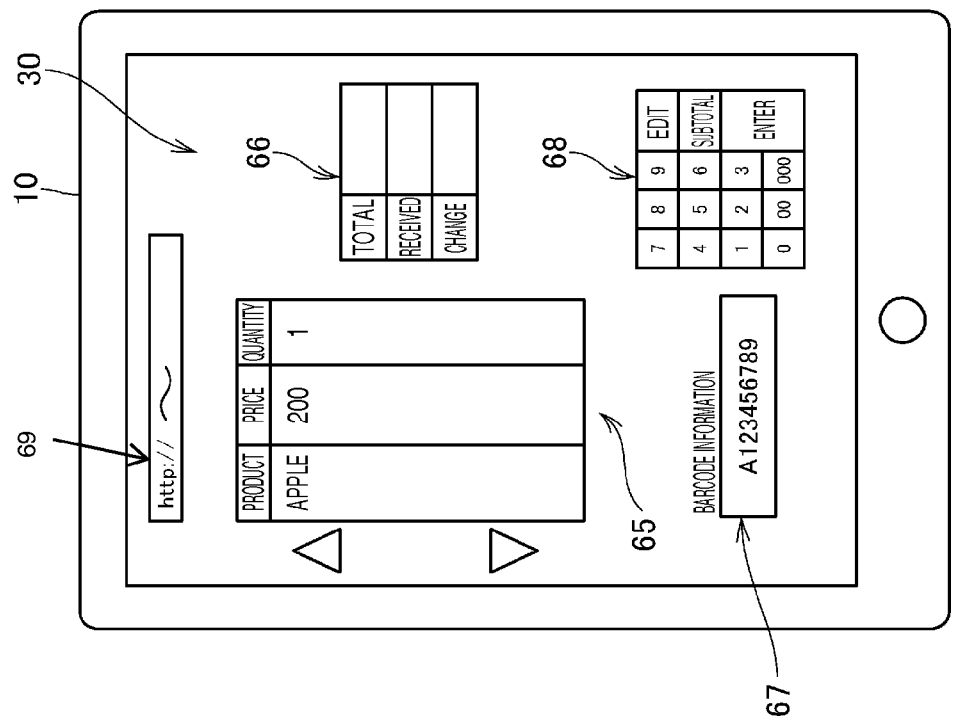
FIGS. 6A and 6B are example schematic views of a user interface according to at least one embodiment.
Figure 6A:
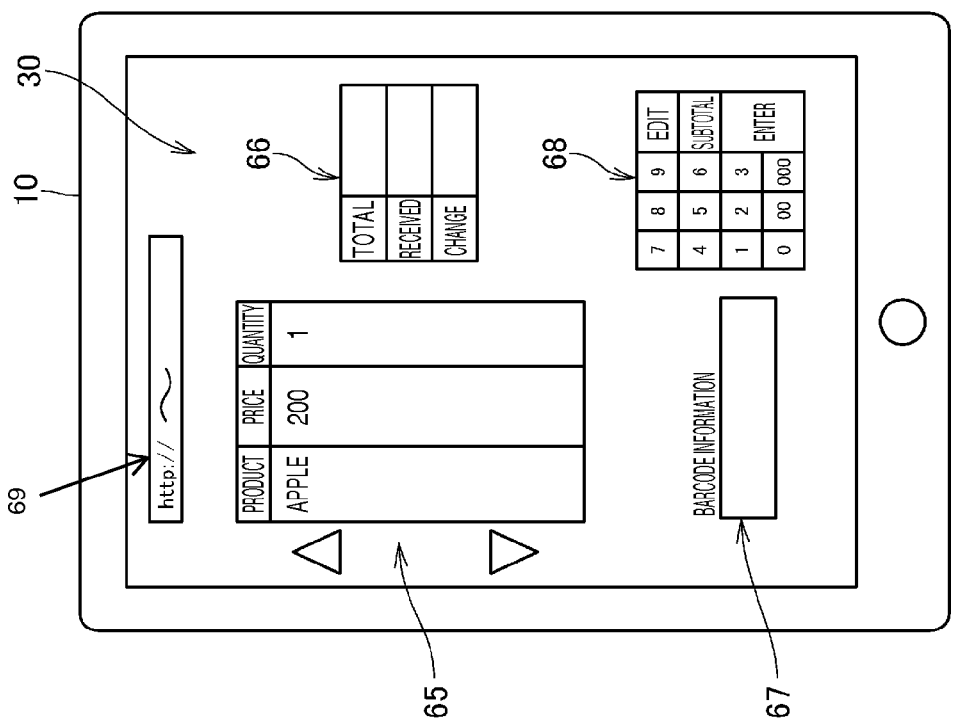

FIG. 6A shows an example of a user interface UI displayed on the touch panel 30.

Displayed in the user interface UI as shown in FIG. 6A is a list area 65 displaying the names of products purchased by the customer, product prices, and product quantities in the upper left area. On the right beside the list area 65 is a transaction amount display area 66 where the total amount of the products purchased by the customer, the amount of money received from the customer for the transaction, and the amount of change due to the customer are displayed.

Below the list area 65 is a barcode information input field 67 where information represented by the barcode read by the barcode scanner 12 ("barcode information" below) is input and displayed. The barcode information is basically identification information uniquely assigned to each type of product. On the right side of the barcode information input field 67 is a virtual keypad 68. Information can be input through this virtual keypad 68 to each of the input fields in the user interface UI, and the virtual keypad 68 has keys for inputting information.

An address field 69 where the accessed address is displayed is presented at the top of the user interface UI.

The process until the barcode information is displayed in the barcode information input field 67 of the user interface UI after a barcode is read by the barcode scanner 12 is described first below.

Figure 7:
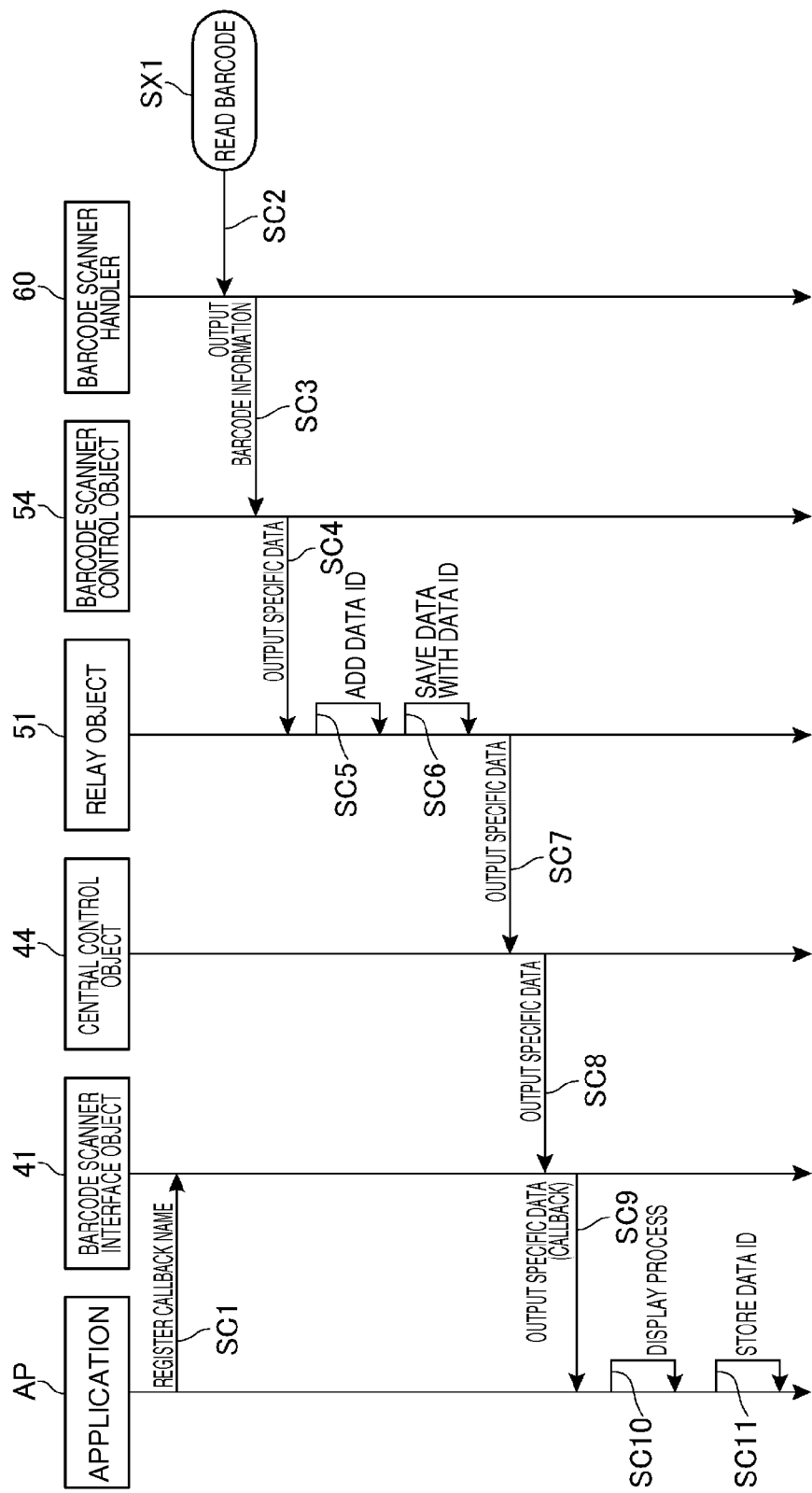
FIG. 7 is a flowchart of a process executed after a barcode is read by the barcode scanner according to at least one embodiment.

FIG. 7 is a flowchart describing this process.

First, to enable the application AP to acquire the result of reading a barcode, a callback name for the barcode scanner interface object 41 is first registered by the application AP (step SC1). A callback name is an identification name assigned to each event (an event such as the barcode scanner 12 reading a barcode). When data linked to the callback name is input to the interface object, a specific callback function is executed, and the data is input to the application AP. In this example, the callback name of "reading a barcode with the barcode scanner 12" is "ondata."

At the checkout counter L, the checkout clerk uses the barcode scanner 12 to read the barcode from a product purchased by the customer (step SX1).

Subsequently, the result of reading the barcode is input to the barcode scanner handler 60 (step SC2). The barcode scanner handler 60 then executes an interrupt process and outputs the barcode information, the result of reading, to the barcode scanner control object 54 (step SC3).

Subsequently, the barcode scanner control object 54 outputs data including at least the device ID of the barcode scanner 12, the callback name (ondata in this example), and the barcode information (data) in a specific format to the relay object 51 (step SC4).

The relay object 51 generates a data ID, and adds the data ID in a predetermined format to the barcode information contained in the input data (step SC5). The data ID is identification information uniquely assigned to identify the data passed to the application AP (barcode information in this example). In at least one embodiment, the data ID is a number, and the relay object 51 generates and assigns the data ID so that the value increases as the time that the data is output to the central control object 44 becomes later. For example, if the data ID generated and assigned to the input barcode information and output to the central control object 44 is 1, the data ID generated and assigned to the next input barcode information and output to the central control object 44 is 2 (or any value other than 2 and greater than 1). How the assigned data ID is used is described below.

Subsequently, the relay object 51 stores the barcode information (data) of the assigned data ID to a specific storage area in the storage unit 22 (step SC6). As a result, data related to the device of the same data ID output to the application AP (information related to the device) is cumulatively stored in the storage unit 22.

Subsequently, the relay object 51 outputs data including at least the device ID of the barcode scanner 12, the callback name (ondata in this example), and the barcode information (data) with the data ID in a specific format to the central control object 44 (step SC7). The relay object 51 outputs the data through the communication link K1 identified by the communication link ID assigned to the barcode scanner control object 54.

Subsequently, the central control object 44 outputs data to a specific interface object (barcode scanner interface object 41 in this example) related to the device ID contained in the input data (step SC8).

Based on the callback name (ondata in this example), the barcode scanner interface object 41 executes the specific callback function, and outputs the barcode information with the data ID to the application AP (step SC9).

The application AP executes the display process based on the input barcode information, and displays the barcode information in the barcode information input field 67 (step SC10). As a result, as shown in FIG. 6B, the barcode information is displayed in the barcode information input field 67.

Subsequently, the application AP extracts the data ID from the input barcode information, and stores the data ID to a specific storage area in the terminal storage unit 25 (step SC11). This step SC11 results in the data ID of the data input to the application AP being extracted from the data output from the device (barcode information in this example) and accumulated in a memory. A process of using the data ID stored in the terminal storage unit 25 is described below.

Steps in a process whereby the application AP controls the printer unit 21 to produce a receipt is described below.

Figure 8:
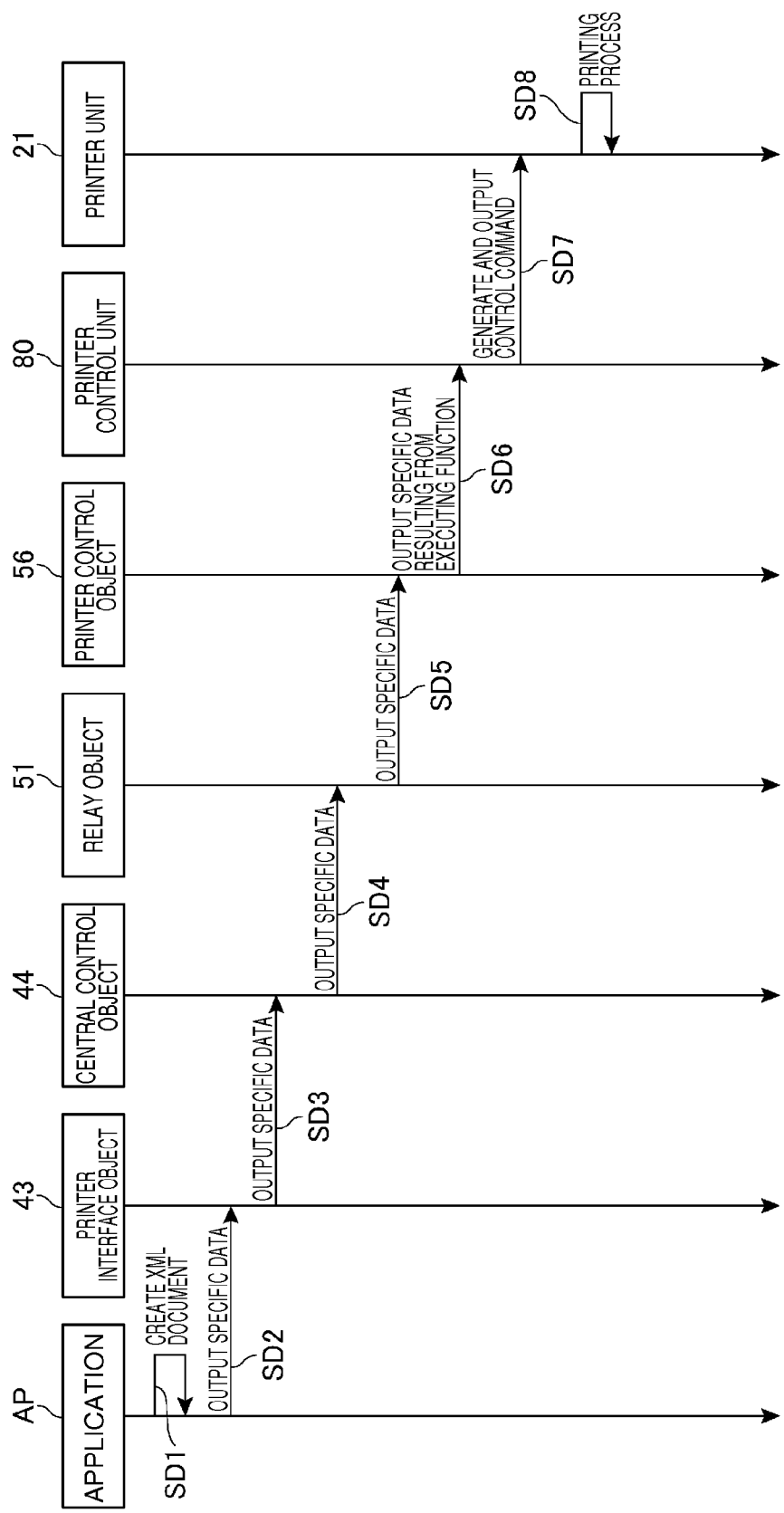
FIG. 8 is a flowchart of a process for printing with the printer unit according to at least one embodiment.

FIG. 8 is a flowchart describing the steps in this process.

First, the application AP generates an image to be printed on the receipt using an embedded function, and then based on the generated image creates an XML document (data) containing the information related to the receipt to be produced by the printer unit 21 (step SD1). Included in the XML document is the information for producing a receipt, such as the text and images to be printed on the receipt, in a specific format conforming to the XML format, and as described below, a printer control unit 80 can convert the XML document to a control command conforming to the command language of the printer unit 21.

Subsequently, the application AP outputs data including at least the device ID of the printer unit 21, information specifying the functions to be executed by the printer control object 56, and the generated XML document, to the printer interface object 43 (step SD2). In this example, the function executed by the printer control object 56 is a function for executing a process that outputs the XML document through a printer/display interface 81 to the printer control unit 80.

Subsequently, the printer interface object 43 requests the printer control object 56 to output the data input from the application AP to the central control object 44 (step SD3). The central control object 44 outputs the data through the communication link K1 to the relay object 51 (step SD4), and the relay object 51 outputs the data to the printer control object 56 (step SD5).

The printer control object 56 outputs the XML file contained in the input data through the printer/display interface 81 to the printer control unit 80 by executing a function specified in the input data (step SD6). At this time, the printer control object 56 outputs the XML file to the printer control unit 80 after formatting or processing the data to enable processing by the printer control unit 80.

The printer control unit 80 is a function block rendered by a function of a so-called printer driver, and based on the input XML file, generates control commands conforming to the command language of the printer unit 21 and outputs to the printer unit 21 through the printer handler 63 (step SD7). The printer unit 21 then operates the required mechanisms to produce a receipt based on the input control commands (step SD8).

Note that displaying data on the display 14 is accomplished by a process of steps similar to those described in FIG. 8.

More specifically, the application AP outputs display data to the display control object 55 through the display interface object 42. The display control object 55 outputs the display data to a display control unit 82 through the printer/display interface 81. The display control unit 82 converts the input display data to control commands conforming to the command language of the display 14, and using a function of the display handler 62 outputs to the display 14. The display 14 then presents the display data based on the control commands.

As described above, device control by the application AP, and exchanging data between the application AP and a device, are desirably achieved for each device by communication between an interface object and a control object corresponding to the target device.

More specifically, the tablet device 10 and control device 11 in at least one embodiment communicate according to the WebSocket standard. That is, any device can send data to another device without sending a data transmission request from the browser on the tablet device 10 to the control device 11 functioning as a server. In other words, the interface object and the corresponding control object can communicate bidirectionally. As a result, as described using the flowchart in FIG. 7, triggered by an event on the device side, data can be output smoothly from the device through the corresponding control object and interface object to the application AP. In addition, as described using the flowchart in FIG. 8, triggered by an event on the application AP side, the application AP can control a device through the corresponding interface object and control object.

Furthermore, as described above, control of a particular device can be established by instantiating a control object for that device. More specifically, instantiating a control object establishes a state enabling data input between the device and the corresponding control object, thereby enabling the application AP to control the corresponding device to execute a process, and enabling the corresponding device to output data to the application AP. As further described below, a control object can cause the device to execute a particular process by outputting data output by the application AP to the device (or the control unit of the device), and can output a control command to the device in response to a request from the application AP to cause the device to execute a particular process.

More specifically, as described above, one function of the barcode scanner control object 54 is a function that, when a barcode was read by the corresponding barcode scanner 12, acquires the result of reading the barcode through an interrupt process, and outputs the acquired reading result through the barcode scanner interface object 41 to the application AP. More specifically, the barcode scanner control object 54 can send the result of reading a barcode to the tablet device 10 as the corresponding barcode scanner 12 reads the barcode. Establishing device control in this instance means establishing a state in which the result of reading by the corresponding barcode scanner 12 can be sent to the tablet device 10. These functions are enabled by instantiating a barcode scanner control object 54.

As described above, the printer control object 56 outputs an XML document created by the application AP to the printer control unit 80 after formatting or converting the data to enable processing by the printer control unit 80. Based on the data output in a processable form, the printer control unit 80 generates and outputs a control command, and produces a receipt (prints a receipt) with the printer unit 21. The printer control object 56 also acquires data output by the printer unit 21 (for example, data identifying the status (such as no paper or an error) of the printer unit 21) through the printer control unit 80. The printer control object 56 then outputs the acquired data through the printer interface object 43 to the application AP. Establishing control of a device here thus means creating a state in which data can be output from the tablet device 10 (application AP) to the corresponding printer unit 21, and a state in which the printer unit 21 can be controlled by the tablet device 10 (application AP) to execute printing and other processes. It also means establishing a state in which data can be sent at appropriate times from the corresponding printer unit 21 to the tablet device 10 (application AP). These functions can be achieved by instantiating a printer control object 56.

Control of a device can also be established by the display control object 55 similarly to the printer control object 56. More specifically, instantiating a display control object 55 establishes a state in which data can be output from the tablet device 10 (application AP) to the corresponding display, and information can be displayed on the display 14 by the tablet device 10 (application AP). Instantiating a display control object 55 also establishes a state in which the display 14 can send data at the appropriate timing to the tablet device 10 (application AP).

Based on a request from the application AP, the cash drawer control object 53 also generates and outputs to the cash drawer 13 a control command corresponding to the process to be executed, and causes the cash drawer 13 to execute a deposit process, withdrawal process, or other process. Generating and outputting this control command is done by the application AP executing a specific set of instructions and/or codes. In other words, the tablet device 10 (application AP) can cause the cash drawer 13 to execute a desired process by specifying a set of instructions and/or codes embedded in the cash drawer control object 53 through the cash drawer interface object 40.

When counting is done by the cash drawer 13, or when a deposit or withdrawal is made with the cash drawer 13, the cash drawer control object 53 acquires the result of that process by an interrupt process, and outputs the acquired process result through the cash drawer interface object 40 to the application AP.

More specifically, establishing device control in this instance means establishing a state in which data can be output from the tablet device 10 (application AP) to the cash drawer 13, and the tablet device 10 (application AP) can control the cash drawer 13 to execute deposit and other processes. It also means establishing a state in which the corresponding cash drawer 13 can send data to the tablet device 10 (application AP) at the appropriate time. These functions are achieved by instantiating a cash drawer control object 53.

The tablet device 10 and control device 11 are connected to communicate wirelessly using a specific standard such as Ethernet (R), but communication can be unintentionally temporarily cut off (interrupted) due to radio interference or other cause. Even when communicating by a wired connection, communication can be temporarily interrupted by disconnection of the communication cable, a poor connection, or other cause.

In such instances, the tablet device 10 and control device 11 execute a process based on the existence of a control object as described below.

Figure 9A:
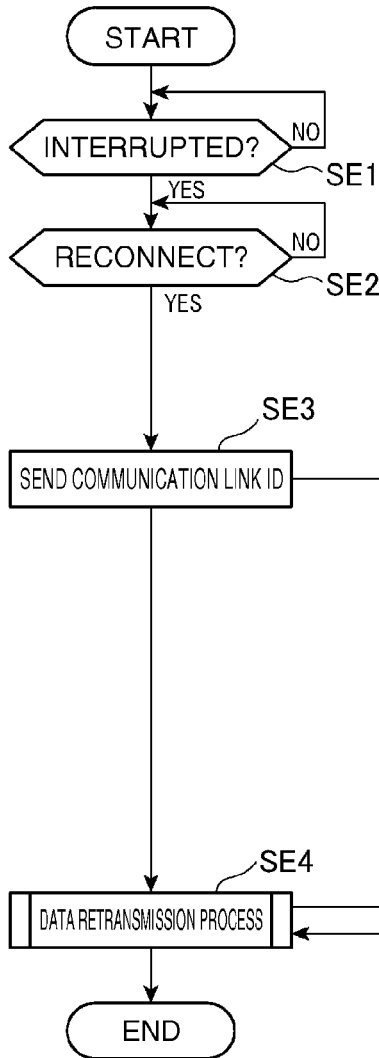
FIGS. 9A and 9B are flowcharts showing the operation of a tablet and a control device according to at least one embodiment.
Figure 9B:
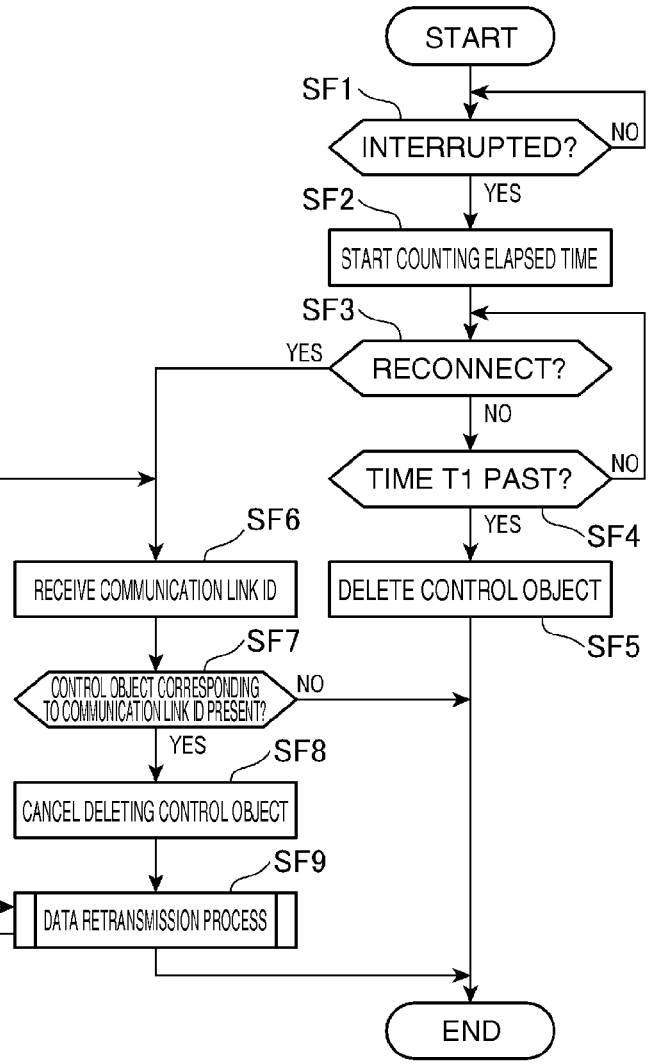

FIGS. 9A and 9B are flowcharts of the operation of the tablet device 10 and control device 11 when communication is interrupted.

FIG. 9A shows the steps of a process of the application AP running on the tablet device 10, and FIG. 9B shows the process of the relay object 51 operating on the control device 11.

The process shown in the flowchart in FIGS. 9A and 9B assumes that a communication link K1 is already established between the tablet device 10 and control device 11, and control objects for the cash drawer 13, barcode scanner 12, display 14, and printer unit 21 have been instantiated by the control device 11.

As shown in FIG. 9A, the application AP monitors whether or not communication is interrupted (step SE1). Note that the browser-side WebSocket interface 45 monitors if communication is interrupted by a means conforming to the WebSocket standard, and when communication is cut off, the browser-side WebSocket interface 45 reports accordingly to the application AP.

When communication is cut off (step SE1 returns YES), the application AP attempts to reconnect using a function of the central control object 44, and determines if reconnecting was successful (step SE2). Attempting to reconnect continues for a predetermined period of time.

As shown in FIG. 9B, the relay object 51 also monitors if communication is cut off (step SF1). Note that the device-side WebSocket interface 50 monitors if communication is interrupted by a means conforming to the WebSocket standard, and when communication is cut off, the device-side WebSocket interface 50 reports accordingly to the relay object 51.

If communication is cut off (step SF1 returns YES), the relay object 51 starts counting the time past since communication was interrupted (step SF2). As will be understood below, the relay object 51 is configured to delete the control object corresponding to the communication link ID associated with the interrupted communication link when the time past since communication was interrupted exceeds time T1. The length of time T1 is set to be a reference value enabling determining if the interruption of communication was an intentional interruption or an unintended breakdown.

After starting to count the elapsed time, the relay object 51 watches if the elapsed time has reached the time T1 (step SF4), and continues checking if reconnection was successful until time T1 is reached (step SF3).

If the elapsed time reaches time T1 without successfully reconnecting (step SF4 returns YES), the interruption of communication can be determined to be an intentional shutdown and not a sudden or temporary failure. The relay object 51 then deletes the control objects corresponding to the communication link ID associated with the interrupted communication connection (in this example, the control objects of the cash drawer 13, barcode scanner 12, display 14, and printer unit 21) (step SF5). As described above, deleting a control object releases the corresponding device to an application AP operating on another tablet, and enables another application AP to instantiate a new control object and control the corresponding device.

If communication between the control device 11 and a tablet device 10 (which could be the same terminal as before communication was interrupted, or a different terminal) is established after a control object is deleted, the device controller 20a instantiates and operates a control object based on a request from the tablet device 10 according to the process described in FIG. 4. As a result, controlling a device can be quickly re-enabled even when reconnecting was not successful within the specific time after communication was interrupted, and the corresponding control object was therefore deleted.

According to at least one embodiment, it is determined that an interruption of communication was intentional if the elapsed time reaches time T1 without successfully reconnecting, and deletes the control object (releases the device). As a result, the time for which another application AP cannot control a device is prevented from continuing for an unnecessarily long time.

Referring again to FIG. 9A, if reconnecting is successful as a result of attempting to reconnect in step SE2 (step SE2 returns YES), the application AP sends the communication link ID of the communication link K1 associated with the communication connection that was interrupted to the relay object 51 (step SE3). As described in step SA3 in FIG. 4, a communication link ID is assigned in conjunction with establishing a communication link K1, and is stored in a specific storage area in the terminal storage unit 25 in a format enabling referencing by the application AP.

Referring to FIG. 9B, because YES is returned by decision step SF3 when re-establishing communication is successful, and the communication link ID of the communication link K1 associated with the interrupted connection is sent by the application AP in step SE3, the relay object 51 receives the communication link ID (step SF6).

When the communication link ID is received, the relay object 51 determines if a control object corresponding to the received communication link ID already exists (step SF7). If the control object does not exist (step SF7 returns NO), the relay object 51 ends the process.

However, if a control object corresponding to the received communication link ID already exists (step SF7 returns YES), the relay object 51 cancels deleting these control objects after time T1, and keeps the control objects instantiated instead of deleting them (controls control object instantiation) (step SF8).

When a communication link is re-established within time T1 after communication was interrupted, it is determined, according to at least one embodiment of the disclosure, that the probability the interruption of communication was an unintended sudden or temporary failure is high, and maintains the control object related to the communication link ID of the communication link K1 through which communication was interrupted. As a result, the application AP can quickly and efficiently control a device without instantiating a new control object to control the device. In addition, when one application AP was controlling a device, device control will not be released to another application AP (the corresponding control object will not be deleted) and device control will not be taken over by another application AP in the event of a sudden or temporary communication failure.

After cancelling deletion of the control object (control of control object instantiation) in step SF8, the application AP and relay object 51 work together to send data again (step SE4, step SF9).

FIGS. 10A and 10B are flowcharts of the operation of application AP and relay object 51 in a data retransmission process. FIG. 10A shows the steps of a process of the application AP running on the tablet device 10, and FIG. 10B shows the process of the relay object 51 operating on the control device 11.

Referring to FIG. 10A, from among the data IDs stored in the terminal storage unit 25, the application AP outputs the data ID of the most recently received data to the relay object 51 (step SG1). As described with reference to step SC11 in FIG. 7, a data ID is assigned to the device data (information related to a device) input to the application AP, and when the data is input, the application AP extracts the data ID from the input data (e.g., barcode information), and stores the data ID in a specific storage area in the terminal storage unit 25.

When a data ID is input from the application AP, the relay object 51 compares the data IDs of the data accumulated in the storage unit 22 with the data ID input from the application AP, and identifies (determines) if there is data that was to be output to the application AP but was not successfully input to the application AP due to a sudden or temporary communication failure (step SH1). More specifically, data IDs are generated based on the rule that the value of the data ID increases as the time when the data is output to the application AP becomes later. Based on this, the relay object 51 knows that data having the same or lower data ID as the data ID received from the application AP was output successfully. However, data having a data ID with a value greater than the received data ID is data that has not been successfully input to the application AP due a sudden or temporary communication failure, and is identified as data that has not been successfully input to the application AP. More specifically, in step SH1 the relay object 51 identifies the data ID of data that has not been input successfully to the tablet device 10 by finding among the data IDs assigned to data sent to the tablet device 10 a data ID that is not stored in the tablet device 10.

Subsequently, the relay object 51 outputs (retransmits) data that has not been successfully input to the application AP (step SH2). The application AP gets and appropriately processes the data output (retransmitted) by the relay object 51 (step SG2).

By executing this data retransmission process, all data that should be output to the application AP can be output to the application AP without data loss even when communication is momentarily interrupted.

As described above, a POS system 1 (control system) according to at least one embodiment of the disclosure includes a device (such as a barcode scanner 12), and a control device 11 having a communication unit that communicates with the device by cooperation of a device interface 71 and handler, and a device controller 20a that instantiates a control object for controlling the device. The POS system 1 also includes a tablet device 10 (terminal) with a touch panel 30 (display unit) that displays a browser, and a terminal control unit 26 (browser execution unit 26a) that instantiates an interface object that communicates data, e.g., device-related information, with the control object, and processes device-related information, by means of an application AP that runs on the browser.

Thus, an application AP running on the browser of the tablet device 10 can get and process device-related information by a function of the control object and interface object, enabling the application AP operating on the browser of the tablet device 10 to control the device.

Multiple devices are connected to the control device 11 in at least one embodiment. When a first device (such as a barcode scanner 12) is connected and a second device (such as a cash drawer 13) is then connected, the device controller 20a of the control device 11 instantiates a second control object (such as cash drawer control object 53) that controls the second device. In addition, the terminal control unit 26 (browser execution unit 26a) of the tablet device 10 instantiates a second interface object (such as a cash drawer interface object 40) that communicates information related to the second device with the second control object.

Thus, a corresponding control object and interface object are instantiated for the second device connected to the control device 11. More specifically, a corresponding control object and interface object are instantiated for each device connected to the control device 11, and using functions of these objects, an application AP operating under the browser of the tablet device 10 can control each of the devices.

A communication link K1 based on the WebSocket standard, which is a communication standard for bidirectional communication, is established between the tablet device 10 and control device 11, and the control object and corresponding interface object communicate bidirectionally through the communication link K1.

Because the control object and corresponding interface object can communicate bidirectionally through the communication link K1 in at least one embodiment of the disclosure, outputting data from the interface object to the control object triggered by an event on the tablet device 10 side, and outputting data from the control object to the interface object triggered by an event on the control device 11 side, can be appropriately executed.

According to at least one embodiment of the disclosure, an interface object corresponding to the control object is instantiated after instantiation of the control object is completed.

This configuration means that a corresponding interface object is reliably instantiated when a control object is instantiated.

A printer unit 21 is connected as a device to the control device 11 in at least one embodiment, and the device controller 20a instantiates a printer control object 56 that controls the printer unit 21.

Thus, the application AP running on the browser of the tablet device 10 can acquire and process information related to the printer unit 21 as the target device using functions of the control object and interface object, and the application AP running on the browser of the tablet device 10 can print to the printer unit 21.

Furthermore, when an application AP running on the browser of the tablet device 10 requests the control device 11 to instantiate a control object for a connected device (requests control of the device), the control device 11 requested to instantiate a control object for the device (requested for control of the device) establishes control of the device by instantiating a control object. After the control device 11 establishes control of the device by instantiating a control object, the tablet device 10 establishes control of the device by the application AP through the control device 11 by instantiating an interface object corresponding to the control object.

Thus, device control is established, and control of the device through the control device 11 by the application AP is sequentially established, in response to a request from the application AP, and control of the device by the application AP operating on the browser of the tablet device 10 is enabled.

The control device 11 in at least one embodiment further establishes device control by instantiating a control object that controls the device.

Device control can thus be established by instantiating a control object.

In at least one embodiment, the tablet device 10 also establishes control of a device by the application AP through the control device 11 by instantiating an interface object with a function for communicating with the control object.

This configuration can establish control of a device by the application AP through the control device 11 by means of instantiating a control object and instantiating an interface object that can communicate with the control object.

The POS system 1 (control system) according to at least one embodiment of the disclosure includes a tablet device 10 having a touch panel 30 (display unit) that displays a browser, and a terminal control unit 26 (browser execution unit 26a) that asserts a communication request (open communication link request) to open a communication connection, and a device control request that requests instantiating a control object (requests device control). The POS system 1 also has a control device 11 including a communication unit that communicates with a device, and a device controller 20*a* that establishes communication with a tablet device 10 based on a communication request sent from the tablet device 10, and establishes control of a device by instantiating a control object based on a device control request after communication with the tablet device 10 is established.

Thus, communication is established and device control is sequentially established according to a communication request from the tablet device 10 and a device control request, enabling control of a device by the tablet device 10 using a function of the browser.

The terminal control unit 26 (browser execution unit 26*a*) of the tablet device 10 outputs a device control delete request requesting deletion of the control object (requesting cancelling control of a device), and the device controller 20*a* of the control device 11 deletes the control object and cancels control of the device based on the device control delete request.

Control of a device can thus be released, and leaving the device under the control of a particular terminal unnecessarily, can thus be prevented by the device control delete request from the tablet device 10.

In at least one embodiment, the application AP of the tablet device 10 outputs a request (cancel communication request) to cut off the communication link K1 established with the control device 11, and the device controller 20*a* of the control device 11 cancels the communication connection based on the cancel communication request.

An established communication connection can thus be appropriately cancelled by a cancel communication request from the tablet device 10.

The tablet device 10 (application AP) in at least one embodiment also outputs a communication request requesting establishing a communication connection, and outputs a device control request requesting instantiating a control object for the printer unit 21 as the device to control (requesting control of the printer unit). The device controller 20*a* of the control device 11 establishes a communication connection with the tablet device 10 based on the communication request, and based on the device control request instantiates a printer control object 56 and establishes control of the printer unit 21 after communication with the tablet device 10 is established.

Communication is thus established and control of the printer unit 21 as the target device is sequentially established according to the communication request and the device control request from the tablet device 10, and using a function of a browser, the tablet device 10 can print with the printer unit 21.

The control device 11 according to the disclosure has a first communication unit that communicates with a device by cooperation of the device interface 71 and handler, a device controller 20*a* that runs a control object that controls the device, and a second communication unit that communicates with the tablet device 10 by the cooperation of the device-side WebSocket interface 50 and relay object 51, and when the connection with the tablet device 10 is interrupted, the device controller 20*a* deletes the control object after waiting time T1.

Thus, the control object is not deleted immediately when communication is interrupted, and is instead deleted after being kept for time T1. As a result, the control object is not immediately deleted when communication is briefly interrupted unintentionally, and control of the device by the control object that was kept without being deleted can quickly resume after recovery from the temporary interruption of communication. In addition, because the control object is deleted after waiting time T1, a control object not being deleted for an unnecessarily long time, and control rights of the device therefore not being released, can be effectively prevented.

Furthermore, when communication between the control device 11 and a tablet device 10 (the same terminal as before communication was interrupted, or a different terminal) is established after communication between the tablet device 10 and control device 11 is interrupted, connection is not re-established within time T1, and the control object is deleted, the device controller 20*a* instantiates and runs a new control object based on a request from the tablet device 10 according to the process described in FIG. 4.

As a result, control of a device can be quickly enabled even when a connection is not re-established within a specific time after communication is interrupted and the control object is therefore deleted.

Furthermore, when a re-connection with the tablet device 10 is made within time T1 in at least one embodiment, deleting the instantiated control object is cancelled (instantiation of a control object is controlled).

Because deleting the control object is thus cancelled when reconnection is successful within time T1 after communication is interrupted, deletion of the control object can be prevented in the event of a temporary interruption such as when connection is re-established within time T1 after communication is cut off.

When a connection is established between the tablet device 10 and control device 11 in at least one embodiment, each device stores identification information (a communication link ID) corresponding to the connection, and when reconnecting after the connection is broken, these devices reconnect based on the identification information stored by each device.

As a result, the identification information (communication link ID) stored by each device can be used as needed when reconnecting in order to reconnect in a way corresponding to the connection that was interrupted.

The control device 11 in at least one embodiment instantiates a control object for each device that is connected in order to control the device. The control device 11 (relay object 51) also stores identification information (communication link ID) related to the control object, and deletes the control object if connection with the tablet device 10 is not re-established within time T1 after the connection to the tablet device 10 is interrupted. When reconnecting after the connection is interrupted, the control device 11 determines if a control object has been instantiated with the same identification information as the identification information stored in the tablet device 10, and if such a control object is found, cancels deleting the control object after a specific time passes.

Thus, deleting a control object that was used before the connection was interrupted is thus prevented in the event of a temporary interruption in which reconnection was successful within time T1 after the connection was interrupted, and the control object can be used after reconnection without instantiating a new control object.

A POS system 1 (control system) according to at least one embodiment of the disclosure has a control device with a first communication unit that communicates with a device and acquires data output by the device by cooperation of the device interface 71 and a handler, a device controller 20*a* that adds corresponding identification information (data ID) to the data (such as barcode information) acquired by the first communication unit, a storage unit 22 that stores the data with the corresponding data ID, and a second communication unit that outputs the data with the corresponding data ID by the cooperation of a device-side WebSocket interface 50 and a relay object 51. The POS system 1 also has a tablet device 10 with a reception unit that receives data with the corresponding data ID output from the control device 11 by the cooperation of a browser-side WebSocket interface 45 and a central control object 44, a terminal storage unit 25 that stores the identification information assigned to the data received by the reception unit, and a terminal control unit 26 that runs an application processing data.

Thus, identification information (data ID) is added to data output from the control device 11 to the tablet device 10, the control device 11 stores the output data, and the tablet device 10 stores the identification information associated with the input data. As a result, when the connection is interrupted, data that has not been successfully input to the tablet device 10 due to an interrupted connection can be identified using the identification information (data ID) as a search key, and the identified data can be output again.

When reconnecting after the connection between the tablet device 10 and control device 11 is interrupted, the tablet device 10 in at least one embodiment sends the stored identification information (data ID) to the control device 11, and the control device 11 identifies and resends data that has not been successfully input to the tablet device 10 based on comparing the identification information (data ID) received from the tablet device 10 with the data IDs of the stored data.

When reconnecting after the connection is interrupted, data that has not been successfully input to the tablet device 10 can thus be appropriately identified using the identification information (data ID).

In at least one embodiment the control device 11 also adds a data ID, based on a predetermined rule, to data input from a device and outputs the data with the corresponding data ID to the tablet device 10, and stores the data that was output with the corresponding data ID. When reconnecting after the connection between the tablet device 10 and control device 11 is interrupted, the tablet device 10 sends the identification information (data ID) related to the most recently received data to the control device 11. The control device 11 compares the identification information (data ID) received from the tablet device 10 with the data IDs of the stored data, and based on the predetermined rule of the identification information (data ID), identifies and resends data that has not been successfully input to the tablet device 10.

In an instance, the tablet device 10 sends the identification information (data ID) for all data input within a specific time, for example, to the control device 11. The control device 11 can therefore identify data that has not been successfully input to the tablet device 10 by the simple means of using the predetermined rule of the identification information (data ID), instead of executing a process such as the control device 11 identifying data not successfully input to the tablet device 10 by comparing the received identification information (data ID) with the data IDs of the stored data.

The disclosure is described above with reference to at least one embodiment thereof, but the disclosure is not limited thereto and can be modified and adapted in many ways without departing from the scope of the accompanying claims.

For example, the disclosure is described in the foregoing description using the POS system 1 in a store with a checkout counter L as an example, but the POS system is not limited to such use, and can be used in the food industry in coffee shops and restaurants, for example. The control device 11 and POS server 17 are also separate devices above, but the function of the POS server 17 could be included in the control device 11. Yet further, the printer unit 21 is a thermal printer as described above, but any desirable recording method can be used.

The function blocks shown in FIGS. 2 and 3 can be desirably achieved by the cooperation of hardware (e.g., application-specific integrated circuit (ASIC)) and software (e.g., one or more programs executed by a processor), without being limited to a specific hardware configuration. The devices may also operate by one or more processors running a program stored on an externally connected non-transitory storage medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A control method of a control system including a terminal configured to execute an application that runs in a web browser, a device configured to send or receive data, and a controller connected to the device, the method comprising:

transmitting, by the terminal, a request for a device control from the application to the controller;

establishing, at the controller, the device control by the controller, after the controller receives the request;

establishing, at the terminal, the device control by the application through the controller, after the establishing the device control by the controller;

deleting at least one of a control object or an interface object upon release of the device control;

upon an interruption of a connection between the terminal and the controller, attempting to re-establish the connection;

deleting the control object at the controller when the connection is not re-established within a predetermined time period; and when the connection is re-established:
sending to the controller a data identification information (ID) of data that was received at the application from the device prior to the interruption of the connection; and
based on the data ID, retransmitting to the terminal data that was not received by the application due to the interruption, wherein
the establishing the device control by the controller comprises instantiating, at the controller, the control object configured to handle data communication between the device and the application,
the establishing the device control by the application through the controller comprises instantiating, at the terminal, the interface object configured to communicate with the control object.

2. The control method of claim 1, wherein the establishing the device control by the controller comprises enabling the device to execute a process in response to a further request from the terminal.

3. The control method of claim 1, wherein the establishing the device control by the controller comprises enabling data communication between the device and the terminal via the controller.

4. The control method of claim 1, wherein
the control system is a point-of-sale (POS) system,
the controller and the device are installed at a checkout counter in the POS system, and
the device comprises at least one selected from the group consisting of a bar code scanner, a receipt printer, a display and a cash drawer.

5. The control method of claim 1, wherein
the control system is a point-of-sale (POS) system,
the controller and the device are installed at a checkout counter in the POS system,
the device comprises a bar code scanner, a receipt printer, a display and a cash drawer, and
the terminal comprises a table computer which communicates over a wireless communication link with the controller.

6. A control system, comprising:
a device configured to send or receive data;
a terminal including
a terminal control unit configured to execute an application that runs in a web browser, configured to output a request for control of the device by the application, and
a first communication module configured to transmit the request of the application; and
a control unit including
a second communication module configured to connect with the first communication module to receive the request from the application,
an interface configured to connect to the device, and
a control unit;
wherein
the control unit is configured to, in response to the request received from the application via the first and second communication modules, instantiate a control object configured to communicate with the device via the interface,
the terminal control unit is configured to, in response to instantiation of the control object, instantiate an interface object configured to communicate between the control object and the application,
the control object and the interface object are configured to enable the control of the device by the application via the interface, the control object, the first and second communication modules, and the interface object,
the terminal control unit is configured to delete the interface object upon release of the control of the device by the application,
upon an interruption of a connection between the terminal and the controller, at least one of the terminal control unit or the control unit is configured to attempt to re-establish the connection,
the control unit is configured to delete the control object when the connection is not re-established within a predetermined time period, and
the control unit is configured to delete the control object upon the release of the control of the device by the application.

7. The control system of claim 6, further comprising a further device configured to send or receive data, wherein
the interface is configured to connect to the further device,
the control unit is configured to instantiate a further control object configured to communicate with the further device via the interface,
the terminal control unit is configured to instantiate a further interface object configured to communicate between the further control object and the application, and
the further control object and the further interface object are configured to enable control of the further device by the application via the interface, the further control object, the first and second communication modules, and the further interface object.

8. The control system of claim 7, wherein
the device is one selected from the group consisting of a scanner, a printer, a display and a cash drawer, and
the further device is another one selected from the group consisting of the scanner, the printer, the display and the cash drawer.

9. The control system of claim 8, wherein
the terminal comprises a table computer, and
the first and second communication modules are configured to establish a wireless communication link between the tablet computer and the controller.

10. The control system of claim 6, wherein, upon the connection being re-established,
the terminal control unit is configured to send to the control unit a data identification information (ID) of data that was received at the application from the device prior to the interruption of the connection, and
based on the data ID, the control unit is configured to retransmit to the terminal data that was not received by the application due to the interruption.

11. A controller of a control system, the control system further including a terminal configured to execute an application that runs in a web browser, and a device configured to send or receive data, the control unit comprising:
a communication module configured to connect with the terminal to receive a request for control of the device from the application;
an interface configured to connect to the device; and
a control unit configured to, in response to the request received from the application, instantiate a control object,
wherein
the control object is configured to:
communicate with the device via the interface, and
communicate with an interface object instantiated at the terminal, to enable the control of the device by the application via the interface, the control object, and the interface object,
the control unit is configured to delete the control object upon receiving from the application a request to release the control of the device by the application,
upon an interruption of a connection between the terminal and the controller, the control unit is configured to:
attempt to re-establish the connection, and
delete the control object when the connection is not re-established within a predetermined time period, and wherein, upon the connection being re-established and based on a data identification information of data that was received at the application from the device prior to the interruption of the connection, the control unit is configured to retransmit to the terminal data that was not received by the application due to the interruption.

\* \* \* \* \*